(12) United States Patent
Schmitz et al.

(10) Patent No.: US 11,607,976 B2
(45) Date of Patent: Mar. 21, 2023

(54) RECLINER MECHANISM HAVING BRACKET

(71) Applicant: FISHER & COMPANY, INCORPORATED, St. Clair Shores, MI (US)

(72) Inventors: Ralph L. Schmitz, Clinton Township, MI (US); Sapan M. Poptani, Northville, MI (US); Christopher J. Ryan, Fraser, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 0 days.

(21) Appl. No.: 17/181,189

(22) Filed: Feb. 22, 2021

(65) Prior Publication Data
US 2021/0276461 A1 Sep. 9, 2021

Related U.S. Application Data

(60) Provisional application No. 62/986,333, filed on Mar. 6, 2020.

(51) Int. Cl.
*B60N 2/427* (2006.01)
*B60N 2/235* (2006.01)

(52) U.S. Cl.
CPC ....... *B60N 2/2356* (2013.01); *B60N 2/42709* (2013.01)

(58) Field of Classification Search
CPC .................................................. B60N 2/42709
See application file for complete search history.

(56) References Cited

U.S. PATENT DOCUMENTS

| | | | |
|---|---|---|---|
| 3,736,026 A | 5/1973 | Ziegler et al. |
| 3,953,069 A | 4/1976 | Tamura et al. |
| 4,219,234 A | 8/1980 | Bell |
| 4,243,264 A | 1/1981 | Bell |
| 4,279,442 A | 7/1981 | Bell |

(Continued)

FOREIGN PATENT DOCUMENTS

| | | |
|---|---|---|
| CA | 2369034 A1 | 7/2002 |
| CA | 2869816 A1 | 10/2013 |

(Continued)

OTHER PUBLICATIONS

Office Action regarding German Patent Application No. 102019212517. 4, dated Mar. 11, 2021. Partial translation provided by Bardehle Pagenberg Partnerschaft mbB.

(Continued)

*Primary Examiner* — Timothy J Brindley
(74) *Attorney, Agent, or Firm* — Harness, Dickey & Pierce, P.L.C.

(57) ABSTRACT

A recliner mechanism includes a housing plate and a recliner heart. The housing plate includes a plate body. The recliner heart is mounted to the housing plate and operable in an unlocked state permitting relative rotation between a seat back and a seat bottom, and a locked state preventing relative rotation between the seatback and the seat bottom. The housing plate includes a fore end proximate a front of the seat bottom and an aft end opposing the fore end and proximate a rear end of the seat bottom. The plate body includes a protrusion extending outwardly therefrom at or near the aft end.

17 Claims, 12 Drawing Sheets

(56) References Cited

U.S. PATENT DOCUMENTS

| | | |
|---|---|---|
| 4,372,610 A | 2/1983 | Fisher, III et al. |
| 4,457,557 A | 7/1984 | Une |
| 4,484,779 A | 11/1984 | Suzuki |
| 4,579,387 A | 4/1986 | Bell |
| 4,634,182 A | 1/1987 | Tanaka |
| 4,684,174 A | 8/1987 | Bell |
| 4,705,319 A | 11/1987 | Bell |
| 4,720,145 A | 1/1988 | Bell |
| 4,733,912 A | 3/1988 | Secord |
| 4,747,641 A | 5/1988 | Bell |
| 4,795,213 A | 1/1989 | Bell |
| 4,822,100 A | 4/1989 | Bell |
| 4,919,482 A | 4/1990 | Landis et al. |
| 4,928,374 A | 5/1990 | Allen |
| 5,007,680 A | 4/1991 | Miyauchi et al. |
| 5,044,647 A | 9/1991 | Patterson |
| 5,154,476 A | 10/1992 | Haider et al. |
| 5,240,309 A | 8/1993 | Kojer |
| 5,248,184 A | 9/1993 | Morris |
| 5,265,937 A | 11/1993 | Allen |
| 5,393,116 A | 2/1995 | Bolsworth et al. |
| 5,419,616 A | 5/1995 | Paetzold |
| 5,435,624 A | 7/1995 | Bray et al. |
| 5,460,429 A | 10/1995 | Whalen |
| 5,489,141 A | 2/1996 | Strausbaugh et al. |
| 5,577,805 A | 11/1996 | Glinter et al. |
| 5,590,932 A | 1/1997 | Olivieri |
| 5,622,410 A | 4/1997 | Robinson |
| 5,628,215 A | 5/1997 | Brown |
| 5,660,440 A | 8/1997 | Pejathaya |
| 5,718,481 A | 2/1998 | Robinson |
| 5,769,493 A | 6/1998 | Pejathaya |
| 5,788,330 A | 8/1998 | Ryan |
| 5,813,724 A | 9/1998 | Matsuura et al. |
| 5,823,622 A | 10/1998 | Fisher, IV et al. |
| 5,857,659 A | 1/1999 | Kato et al. |
| 5,918,939 A | 7/1999 | Magadanz |
| 5,927,809 A | 7/1999 | Tame |
| 5,941,591 A | 8/1999 | Tsuge et al. |
| 5,947,560 A | 9/1999 | Chen |
| 5,979,986 A | 11/1999 | Pejathaya |
| 6,007,152 A | 12/1999 | Kojima et al. |
| 6,023,994 A | 2/2000 | Yoshida |
| 6,047,444 A | 4/2000 | Braun |
| 6,068,341 A | 5/2000 | Rink |
| 6,074,009 A | 6/2000 | Farino |
| 6,095,609 A | 8/2000 | Magadanz |
| 6,106,067 A | 8/2000 | Zhuang et al. |
| 6,123,380 A | 9/2000 | Sturt et al. |
| 6,139,104 A | 10/2000 | Brewer |
| 6,158,800 A | 12/2000 | Tsuge et al. |
| 6,161,899 A | 12/2000 | Yu |
| 6,199,953 B1 | 3/2001 | Chen |
| 6,250,704 B1 | 6/2001 | Garrido |
| 6,290,297 B1 | 9/2001 | Yu |
| 6,328,381 B1 | 12/2001 | Smuk |
| 6,345,867 B1 | 2/2002 | Hellrung et al. |
| 6,447,066 B1 | 9/2002 | Chabanne et al. |
| 6,511,129 B1 | 1/2003 | Minor et al. |
| 6,533,357 B2 | 3/2003 | Pospeshil et al. |
| 6,550,864 B1 | 4/2003 | Zarna et al. |
| 6,554,362 B1 | 4/2003 | Pospeshil |
| 6,634,713 B2 | 10/2003 | Nonomiya et al. |
| 6,669,296 B2 | 12/2003 | Moriyama et al. |
| 6,669,299 B2 | 12/2003 | Carlson et al. |
| 6,698,837 B2 | 3/2004 | Pejathaya et al. |
| 6,709,053 B1 * | 3/2004 | Humer .............. B60N 2/42709 297/216.14 |
| 6,740,845 B2 | 5/2004 | Stol et al. |
| 6,758,525 B2 | 7/2004 | Uramichi |
| 6,854,802 B2 | 2/2005 | Matsuura et al. |
| 6,857,703 B2 | 2/2005 | Bonk |
| 6,860,562 B2 | 3/2005 | Bonk |
| 6,869,143 B2 | 3/2005 | Secord |
| 6,908,156 B1 | 6/2005 | Park et al. |
| 7,025,422 B2 | 4/2006 | Fast |
| 7,093,901 B2 | 8/2006 | Yamada |
| 7,097,253 B2 | 8/2006 | Coughlin et al. |
| 7,100,987 B2 | 9/2006 | Volker et al. |
| 7,121,624 B2 | 10/2006 | Pejathaya et al. |
| 7,152,924 B1 | 12/2006 | Nemoto et al. |
| 7,154,065 B2 | 12/2006 | Martukanitz et al. |
| 7,172,253 B2 | 2/2007 | Haverkamp |
| 7,198,330 B2 | 4/2007 | Wahlen et al. |
| 7,293,838 B2 | 11/2007 | Sugama et al. |
| 7,296,857 B2 | 11/2007 | Shinozaki et al. |
| 7,300,109 B2 | 11/2007 | Hofmann et al. |
| 7,306,286 B2 | 12/2007 | Syrowik et al. |
| 7,328,954 B2 | 2/2008 | Sasaki et al. |
| 7,360,838 B2 | 4/2008 | Smuk |
| 7,419,217 B2 | 9/2008 | Ishizuka |
| 7,458,639 B2 | 12/2008 | Thiel et al. |
| 7,490,907 B2 | 2/2009 | Nagura et al. |
| 7,503,099 B2 | 3/2009 | Pejathaya |
| 7,527,336 B2 | 5/2009 | Kienke et al. |
| 7,578,556 B2 | 8/2009 | Ohba et al. |
| 7,604,297 B2 | 10/2009 | Weber |
| 7,695,068 B2 | 4/2010 | Maeda et al. |
| 7,775,591 B2 | 8/2010 | Hahn et al. |
| 7,775,594 B2 | 8/2010 | Bruck et al. |
| 7,976,103 B2 | 7/2011 | Gamache et al. |
| 8,052,215 B2 | 11/2011 | Ito |
| 8,128,169 B2 | 3/2012 | Narita et al. |
| 8,360,527 B2 | 1/2013 | Lehmann |
| 8,430,454 B2 | 4/2013 | Tanguy et al. |
| 8,449,034 B2 | 5/2013 | Tame et al. |
| 8,845,019 B2 * | 9/2014 | Sawada .............. B60N 2/4214 297/216.1 |
| 8,985,690 B2 | 3/2015 | Yamada et al. |
| 9,102,248 B2 | 8/2015 | Matt |
| 9,108,541 B2 | 8/2015 | Assmann et al. |
| 9,221,364 B2 | 12/2015 | Nock et al. |
| 9,227,532 B2 | 1/2016 | Balzar et al. |
| 9,296,315 B2 | 3/2016 | Hellrung |
| 9,475,409 B2 | 10/2016 | Jiang et al. |
| 9,527,410 B2 | 12/2016 | Leconte |
| 9,527,419 B2 | 12/2016 | Hosbach et al. |
| 9,555,725 B2 | 1/2017 | Rothstein et al. |
| 9,573,493 B2 | 2/2017 | Nagura et al. |
| 9,616,779 B2 | 4/2017 | Barzen et al. |
| 9,623,774 B2 | 4/2017 | Yamada et al. |
| 9,701,222 B2 | 7/2017 | Kitou |
| 9,751,432 B2 | 9/2017 | Assmann |
| 9,873,357 B1 | 1/2018 | McCulloch et al. |
| 9,889,774 B2 | 2/2018 | Espinosa et al. |
| 10,150,387 B2 | 12/2018 | Hiemstra et al. |
| 10,279,709 B2 | 5/2019 | Suzuki et al. |
| 10,399,466 B2 | 9/2019 | Chang |
| 10,610,018 B1 | 4/2020 | Madhu |
| 10,787,098 B2 | 9/2020 | Smuk |
| 10,800,296 B2 | 10/2020 | Schmitz et al. |
| 10,864,830 B2 | 12/2020 | Schmitz et al. |
| 11,052,797 B2 | 7/2021 | Poptani et al. |
| 2002/0043852 A1 | 4/2002 | Uramichi |
| 2003/0127898 A1 | 7/2003 | Niimi et al. |
| 2003/0178879 A1 | 9/2003 | Uramichi |
| 2003/0230923 A1 | 12/2003 | Uramichi |
| 2004/0134055 A1 | 7/2004 | Aizaki |
| 2004/0145226 A1 | 7/2004 | Bonk |
| 2004/0195889 A1 | 10/2004 | Secord |
| 2005/0029806 A1 | 2/2005 | Yamanashi et al. |
| 2005/0253439 A1 | 11/2005 | Sasaki et al. |
| 2006/0006718 A1 | 1/2006 | Umezaki |
| 2006/0012232 A1 | 1/2006 | Coughlin et al. |
| 2006/0055223 A1 | 3/2006 | Thiel et al. |
| 2006/0170269 A1 | 8/2006 | Oki |
| 2007/0138854 A1 | 6/2007 | Paing et al. |
| 2007/0200408 A1 | 8/2007 | Ohta et al. |
| 2008/0001458 A1 | 1/2008 | Hoshihara et al. |
| 2008/0164741 A1 | 7/2008 | Sakamoto |
| 2009/0001797 A1 | 1/2009 | Neumann |
| 2009/0056124 A1 | 3/2009 | Krebs et al. |
| 2009/0072602 A1 | 3/2009 | Schuler |
| 2010/0072802 A1 | 3/2010 | Smith et al. |

(56) References Cited

U.S. PATENT DOCUMENTS

| | | | |
|---|---|---|---|
| 2010/0096892 A1* | 4/2010 | Meghira | B60N 2/4214 297/216.14 |
| 2010/0096896 A1 | 4/2010 | Nonomiya | |
| 2010/0176621 A1* | 7/2010 | Aufrere | B60N 2/42745 296/68.1 |
| 2010/0231021 A1 | 9/2010 | Myers et al. | |
| 2010/0283304 A1 | 11/2010 | Thiel | |
| 2010/0308634 A1 | 12/2010 | Narita et al. | |
| 2010/0308635 A1 | 12/2010 | Tame et al. | |
| 2010/0320823 A1 | 12/2010 | Thiel | |
| 2011/0068612 A1 | 3/2011 | Thiel | |
| 2011/0127814 A1 | 6/2011 | Thiel | |
| 2011/0227386 A1 | 9/2011 | Berndtson et al. | |
| 2011/0309665 A1 | 12/2011 | Leighton et al. | |
| 2012/0086253 A1 | 4/2012 | Nock et al. | |
| 2012/0169102 A1 | 7/2012 | Hiemstra et al. | |
| 2012/0248841 A1 | 10/2012 | Hellrung et al. | |
| 2013/0161995 A1 | 6/2013 | Yamada et al. | |
| 2013/0207434 A1 | 8/2013 | Stilleke et al. | |
| 2013/0270884 A1 | 10/2013 | Espinosa et al. | |
| 2014/0008958 A1 | 1/2014 | Ito | |
| 2014/0091607 A1 | 4/2014 | Maeda | |
| 2014/0138998 A1 | 5/2014 | Christoffel et al. | |
| 2014/0159458 A1 | 6/2014 | Lu et al. | |
| 2014/0225411 A1 | 8/2014 | Matt | |
| 2014/0239691 A1 | 8/2014 | Hellrung | |
| 2014/0301682 A1 | 10/2014 | Leppla | |
| 2015/0015044 A1 | 1/2015 | Teufel et al. | |
| 2015/0069809 A1 | 3/2015 | Matt | |
| 2015/0091346 A1* | 4/2015 | Kitou | B60N 2/682 297/216.14 |
| 2015/0091354 A1 | 4/2015 | Enokijima et al. | |
| 2015/0123444 A1 | 5/2015 | Assmann | |
| 2015/0266398 A1 | 9/2015 | Higashi et al. | |
| 2015/0306986 A1 | 10/2015 | Jarry et al. | |
| 2015/0321585 A1 | 11/2015 | McCulloch et al. | |
| 2016/0023577 A1 | 1/2016 | Yamada et al. | |
| 2016/0107546 A1 | 4/2016 | Barzen et al. | |
| 2016/0272089 A1 | 9/2016 | Kim et al. | |
| 2016/0339810 A1 | 11/2016 | Pluta et al. | |
| 2017/0037945 A1 | 2/2017 | Maeda et al. | |
| 2017/0080828 A1 | 3/2017 | Aktas | |
| 2017/0088021 A1 | 3/2017 | Noguchi et al. | |
| 2017/0136921 A1 | 5/2017 | Dill et al. | |
| 2018/0043800 A1 | 2/2018 | Maeda et al. | |
| 2018/0056819 A1 | 3/2018 | Schmitz et al. | |
| 2018/0103760 A1 | 4/2018 | Fujita et al. | |
| 2018/0154802 A1 | 6/2018 | Ito | |
| 2018/0208087 A1* | 7/2018 | Baba | B60N 2/002 |
| 2018/0339613 A1* | 11/2018 | Mizobata | B60N 2/682 |
| 2019/0255979 A1 | 8/2019 | Zahn et al. | |
| 2019/0299821 A1 | 10/2019 | Maeda et al. | |
| 2019/0329674 A1 | 10/2019 | Schmitz et al. | |
| 2019/0337424 A1 | 11/2019 | Chang | |
| 2019/0358694 A1 | 11/2019 | Yamakita | |
| 2020/0047644 A1 | 2/2020 | Schmitz et al. | |
| 2020/0070689 A1 | 3/2020 | Naik et al. | |
| 2020/0253380 A1 | 8/2020 | Schmitz et al. | |
| 2020/0282879 A1 | 9/2020 | Schmitz et al. | |
| 2020/0331367 A1 | 10/2020 | Schmitz et al. | |
| 2021/0039528 A1 | 2/2021 | Poptani et al. | |
| 2021/0061139 A1 | 3/2021 | Schmitz et al. | |

FOREIGN PATENT DOCUMENTS

| | | | | |
|---|---|---|---|---|
| CN | 1291566 | A | 4/2001 | |
| CN | 1457306 | A | 11/2003 | |
| CN | 1840382 | A | 10/2006 | |
| CN | 101148152 | A | 3/2008 | |
| CN | 101616820 | A | 12/2009 | |
| CN | 101925485 | A | 12/2010 | |
| CN | 202086037 | U | 12/2011 | |
| CN | 102442228 | A | 5/2012 | |
| CN | 103025568 | A | 4/2013 | |
| CN | 103298652 | A | 9/2013 | |
| CN | 203228664 | U | 10/2013 | |
| CN | 203381519 | U | 1/2014 | |
| CN | 103702860 | A | 4/2014 | |
| CN | 203974603 | U | 12/2014 | |
| CN | 105189196 | A | 12/2015 | |
| CN | 205097989 | U | 3/2016 | |
| CN | 205130981 | U | 4/2016 | |
| CN | 107428269 | A | 12/2017 | |
| CN | 207291755 | U | 5/2018 | |
| CN | 112339625 | A | 2/2021 | |
| DE | 907608 | C | 3/1954 | |
| DE | 1098292 | B | 1/1961 | |
| DE | 4324734 | A1 | 1/1995 | |
| DE | 102007002366 | B3 | 7/2008 | |
| DE | 102008026176 | A1 | 12/2009 | |
| DE | 102008029438 | A1 | 12/2009 | |
| DE | 102010038795 | A1 | 2/2012 | |
| DE | 102011013163 | A1 | 9/2012 | |
| DE | 102011108976 | A1 | 1/2013 | |
| DE | 102012008940 | A1 | 11/2013 | |
| DE | 112014000343 | T5 | 9/2015 | |
| DE | 102017100374 | A1 | 7/2017 | |
| DE | 202018107311 | U1 * | 4/2019 | |
| EP | 1074426 | A2 | 2/2001 | |
| GB | 1136097 | A | 12/1968 | |
| GB | 1546104 | A | 5/1979 | |
| JP | 2000084684 | A | 3/2000 | |
| JP | 2000153327 | A | 6/2000 | |
| JP | 2002119349 | A | 4/2002 | |
| JP | 5290789 | B2 | 9/2013 | |
| JP | 5555969 | B2 | 7/2014 | |
| KR | 100601809 | B1 | 7/2006 | |
| KR | 100817000 | B1 | 3/2008 | |
| KR | 20090035633 | A | 4/2009 | |
| KR | 20140001651 | A | 1/2014 | |
| KR | 101420164 | B1 | 7/2014 | |
| KR | 101655777 | B1 | 9/2016 | |
| WO | WO-9620848 | A1 | 7/1996 | |
| WO | WO-2011069107 | A2 | 6/2011 | |
| WO | WO-2013133245 | A1 * | 9/2013 | B60N 2/0705 |
| WO | WO-2013167240 | A1 | 11/2013 | |
| WO | WO-2016115986 | A1 * | 7/2016 | B60N 2/22 |
| WO | WO-2017118496 | A1 * | 7/2017 | B60N 2/1615 |

OTHER PUBLICATIONS

Office Action regarding Indian Patent Application No. 201921032346, dated Mar. 18, 2021.

Office Action regarding Chinese Patent Application No. 201910334168. 9, dated Apr. 30, 2021. Translation provided by Unitalen Attorneys at Law.

Office Action regarding Chinese Patent Application No. 201910725351. 1, dated Jul. 5, 2021.

Office Action regarding U.S. Appl. No. 16/740,874, dated Oct. 20, 2021.

Office Action regarding German Patent Application No. 10 2019 211 855.0, dated Nov. 25, 2021.

Office Action regarding Chinese Patent Application No. 2021120202214440, dated Dec. 7, 2021.

Office Action regarding Chinese Patent Application No. 201910801476. 8, dated Dec. 17, 2021.

U.S. Appl. No. 16/524,325, filed Jul. 29, 2019, Ralph L. Schmitz et al.

U.S. Appl. No. 16/542,369, filed Aug. 16, 2019, Firoz Divan Naik et al.

U.S. Appl. No. 16/740,874, filed Jan. 13, 2020, Ralph L. Schmitz et al.

U.S. Appl. No. 16/811,112, filed Mar. 6, 2020, Ralph L. Schmitz et al.

U.S. Appl. No. 16/842,135, filed Apr. 7, 2020, Ralph L. Schmitz et al.

U.S. Appl. No. 16/914,569, filed Jun. 29, 2020, Sapan Mahendra Poptani et al.

U.S. Appl. No. 16/996,991, filed Aug. 19, 2020, Ralph L. Schmitz et al.

(56) References Cited

OTHER PUBLICATIONS

Office Action regarding U.S. Appl. No. 16/996,991, dated Sep. 9, 2021.
Notice of Allowance regarding U.S. Appl. No. 16/996,991, dated Oct. 4, 2021.
Office Action regarding U.S. Appl. No. 16/542,369, dated Jul. 16, 2021.
Office Action regarding U.S. Appl. No. 16/542,369, dated May 17, 2021.
Notice of Allowance regarding U.S. Appl. No. 16/542,369, dated Oct. 10, 2021.
Office Action regarding U.S. Appl. No. 16/842,135, dated Sep. 16, 2021.
Office Action regarding U.S. Appl. No. 16/740,874, dated Apr. 26, 2021.
Office Action regarding U.S. Appl. No. 16/740,874, dated Aug. 16, 2021.
Office Action regarding U.S. Appl. No. 16/811,112, dated Sep. 3, 2021.
Office Action regarding German Application No. 102019110151.4, dated Jul. 12, 2021.
Office Action regarding German Patent Application No. 102020200559.1, dated Jul. 23, 2021.
SPI Lasers UK Ltd., "Opening new possibilities with single mode oscillation welding (CW)." Presented at: Laser World of Photonics China; Shanghai, China (Mar. 2008).
Office Action regarding Canadian Patent Application No. 2,812,408, dated Jun. 17, 2016.
Office Action regarding German Patent Application No. 102016114406.1, dated Apr. 27, 2020. Translation provided by Witte, Weller & Partner Patentanwälte mbB.
International Search Report regarding International Application No. PCT/US2020/021377, dated Jun. 30, 2020.
Written Opinion of the International Searching Authority regarding International Application No. PCT/US2020/021377, dated Jun. 30, 2020.
Office Action regarding German Patent Application No. 102019211855.0, dated Feb. 4, 2021. Partial translation provided by Bardehle Pagenberg Partnerschaft mbB.
Office Action regarding Chinese Patent Application No. 202010305091.5, dated Jan. 27, 2022. Translation provided by Unitalen Attorneys at Law.
Office Action regarding German Patent Application No. 102013103671.6, dated May 20, 2021. Translation provided by Witte, Weller & Partner Patentanwälte mbB.
First Chinese Office Action regarding Application No. 201910801476.8 dated Aug. 10, 2021. English translation provided by Unitalen Attorneys at Law.
Office Action regarding German Patent Application 10 2020 204 814.2 dated Jun. 8, 2022.
Office Action regarding Chinese Patent Application No. 2020103050915, dated Jun. 23, 2022.

* cited by examiner

RECLINER MECHANISM HAVING BRACKET

CROSS-REFERENCE TO RELATED APPLICATIONS

This application claims the benefit of U.S. Provisional Application No. 62/986,333, filed on Mar. 6, 2020. The entire disclosure of the above application is incorporated herein by reference.

FIELD

The present disclosure relates to a recliner mechanism having a bracket.

BACKGROUND

This section provides background information related to the present disclosure and is not necessarily prior art.

Vehicle seats often include a recliner mechanism that can rotate a seatback relative to a seat bottom. A hand lever can be rotated to move the recliner mechanism between a locked position preventing relative rotation between the seatback and the seat bottom and an unlocked position permitting relative rotation between the seatback and the seat bottom. When a conventional recliner mechanism is in the locked position, tolerances between components of the recliner heart may allow some movement of the seatback relative to the seat bottom. The present disclosure provides a recliner mechanism that reduces or prevents movement of the seatback relative to the seat bottom when the recliner mechanism is in the locked position during an impact event.

SUMMARY

This section provides a general summary of the disclosure, and is not a comprehensive disclosure of its full scope or all of its features.

In one form, the present disclosure provides a recliner mechanism that includes a housing plate and a recliner mechanism. The housing plate includes a plate body. The recliner heart is mounted to the housing plate and operable in an unlocked state permitting relative rotation between a seatback and a seat bottom, and a locked state preventing relative rotation between the seatback and the seat bottom. The housing plate includes a fore end proximate a front of the seat bottom and an aft end opposing the fore end and proximate a rear end of the seat bottom. The plate body includes a protrusion extending outwardly therefrom at or near the aft end.

In some configurations of the recliner mechanism of the above paragraph, the protrusion is allowed to absorb energy and deform upon an impact event, thereby reducing energy transferred to the recliner heart.

In some configurations of the recliner mechanism of any one or more of the above paragraphs, the protrusion is allowed to absorb energy and stretch upon an impact event, thereby reducing energy transferred to the recliner heart.

In some configurations of the recliner mechanism of any one or more of the above paragraphs, the protrusion is allowed to absorb energy and collapse upon an impact event, thereby reducing energy transferred to the recliner heart.

In some configurations of the recliner mechanism of any one or more of the above paragraphs, the housing plate includes a flange extending from and at least partially around the plate body. The flange and the protrusion extend in the same direction.

In some configurations of the recliner mechanism of any one or more of the above paragraphs, the plate body includes another protrusion extending outwardly therefrom at or near the fore end of the housing plate. A first distance between a surface of the plate body and a peak of the protrusion is different from a second distance between the surface of the plate body and another peak of the another protrusion.

In some configurations of the recliner mechanism of any one or more of the above paragraphs, the plate body defines an opening extending therethrough so an end of the protrusion is spaced apart from the plate body.

In some configurations of the recliner mechanism of any one or more of the above paragraphs, the protrusion is an elongated protrusion extending from the aft end of the housing plate toward the fore end of the housing plate.

In some configurations of the recliner mechanism of any one or more of the above paragraphs, the protrusion has a first end positioned at or near the aft end and a second end positioned at or near the fore end. The protrusion is curved along a length thereof from the first end to the second end.

In some configurations of the recliner mechanism of any one or more of the above paragraphs, the protrusion has an arcuate shape.

In another form, the present disclosure provides a recliner assembly for a seat assembly having a seatback frame and a seat bottom frame. The recliner assembly includes a first recliner mechanism and a second recliner mechanism. The first recliner mechanism is coupled to one side of the seat bottom frame and includes a first bracket plate and a first recliner heart. The first recliner heart is mounted to the first bracket plate and operable in an unlocked state permitting relative rotation between the seatback frame and the seat bottom frame, and a locked state preventing relative rotation between the seatback frame and the seat bottom frame. The second recliner mechanism is coupled to another side of the seat bottom frame that is opposite the one side and includes a second bracket plate and a second recliner heart. The second recliner heart is mounted to the second bracket plate and operable in an unlocked state permitting relative rotation between the seatback frame and the seat bottom frame, and a locked state preventing relative rotation between the seatback frame and the seat bottom frame. The first bracket plate includes a first plate body having a first gusset extending outwardly therefrom. The first gusset being of a first shape. The second bracket plate includes a second plate body having a second gusset extending outwardly therefrom. The second gusset being of a second shape that is different than the first shape.

In some configurations of the recliner assembly of the above paragraph, the first and second gussets are allowed to absorb energy and deform upon an impact event, thereby reducing energy transferred to the first and second recliner hearts.

In some configurations of the recliner assembly of any one or more of the above paragraphs, the first bracket plate includes a first flange extending from and around the first plate body. The first flange and the first gusset extend in the same direction.

In some configurations of the recliner assembly of any one or more of the above paragraphs, the second bracket plate includes a second flange extending from and around the second plate body. The second flange and the second gusset extend in the same direction.

In some configurations of the recliner assembly of any one or more of the above paragraphs, the first gusset at least partially extends from the first flange and the second gusset at least partially extends from the second flange.

In some configurations of the recliner assembly of any one or more of the above paragraphs, the first plate body defines an opening extending therethrough so an end of the first gusset is spaced apart from the first plate body. The second gusset is an elongated gusset extending from an aft end of the second bracket plate toward a fore end of the second bracket plate.

In some configurations of the recliner assembly of any one or more of the above paragraphs, a first distance between a first surface of the first plate body and a first peak of the first gusset is different from a second distance between the second surface of the second plate body and a second peak of the second gusset.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
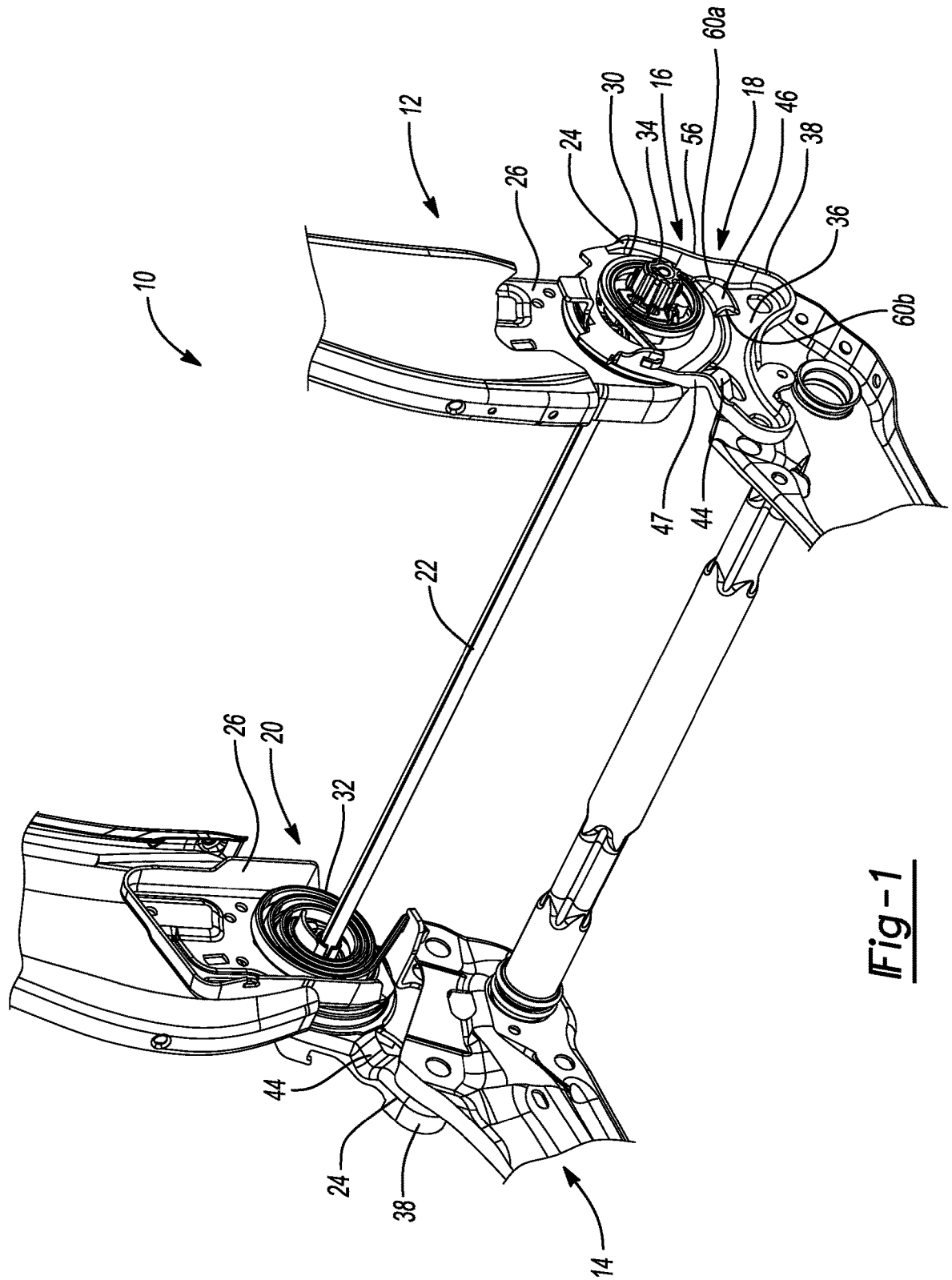
FIG. 1 is a partial perspective view of a vehicle seat assembly having a recliner assembly according to the principles of the present disclosure.
Figure 2:
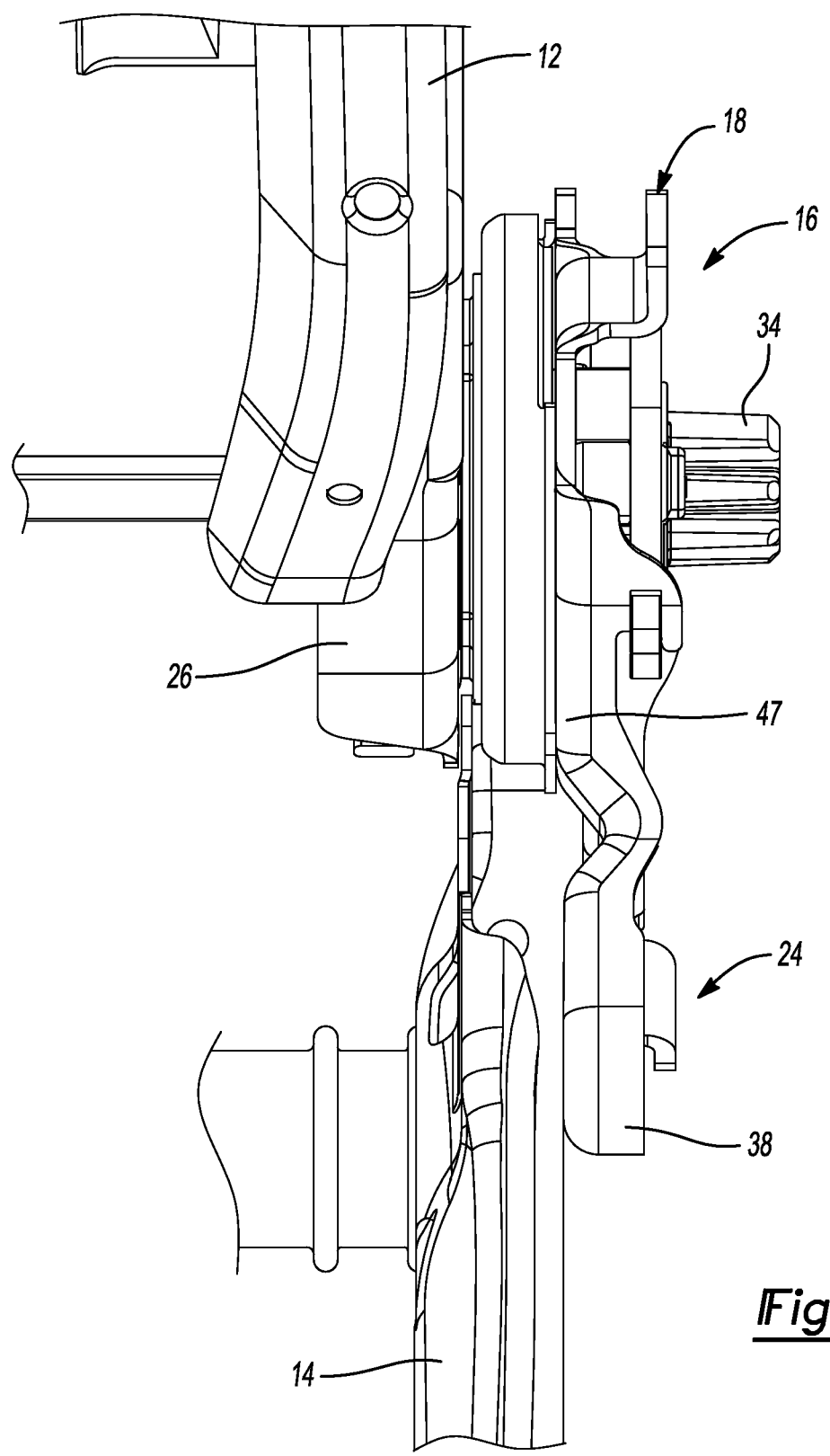
FIG. 2 is a front view of a recliner mechanism of the recliner assembly of FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIG. 1, a vehicle seat assembly 10 is provided. The vehicle seat assembly 10 may be positioned within a vehicle and may include a seatback frame 12, a seat bottom frame 14, and a seat recliner assembly 16. The seatback frame 12 may be disposed within and covered by a seatback (e.g. cushioning and upholstery) and the seat bottom frame 14 may be disposed within and covered by a seat bottom (e.g. cushioning and upholstery). The seat recliner assembly 16 is connected to the seat bottom frame 14 and the seatback frame 12 and can be actuated to allow movement of the seatback frame 12 relative to the seat bottom frame 14 among an upright position (FIG. 1), a rearward reclined position and a forward dump position. With reference to FIGS. 1-5, the seat recliner assembly 16 may include a first recliner mechanism 18, a second recliner mechanism 20 (FIGS. 1 and 3), a cross member 22, and a hand lever or release lever.

Figure 5:
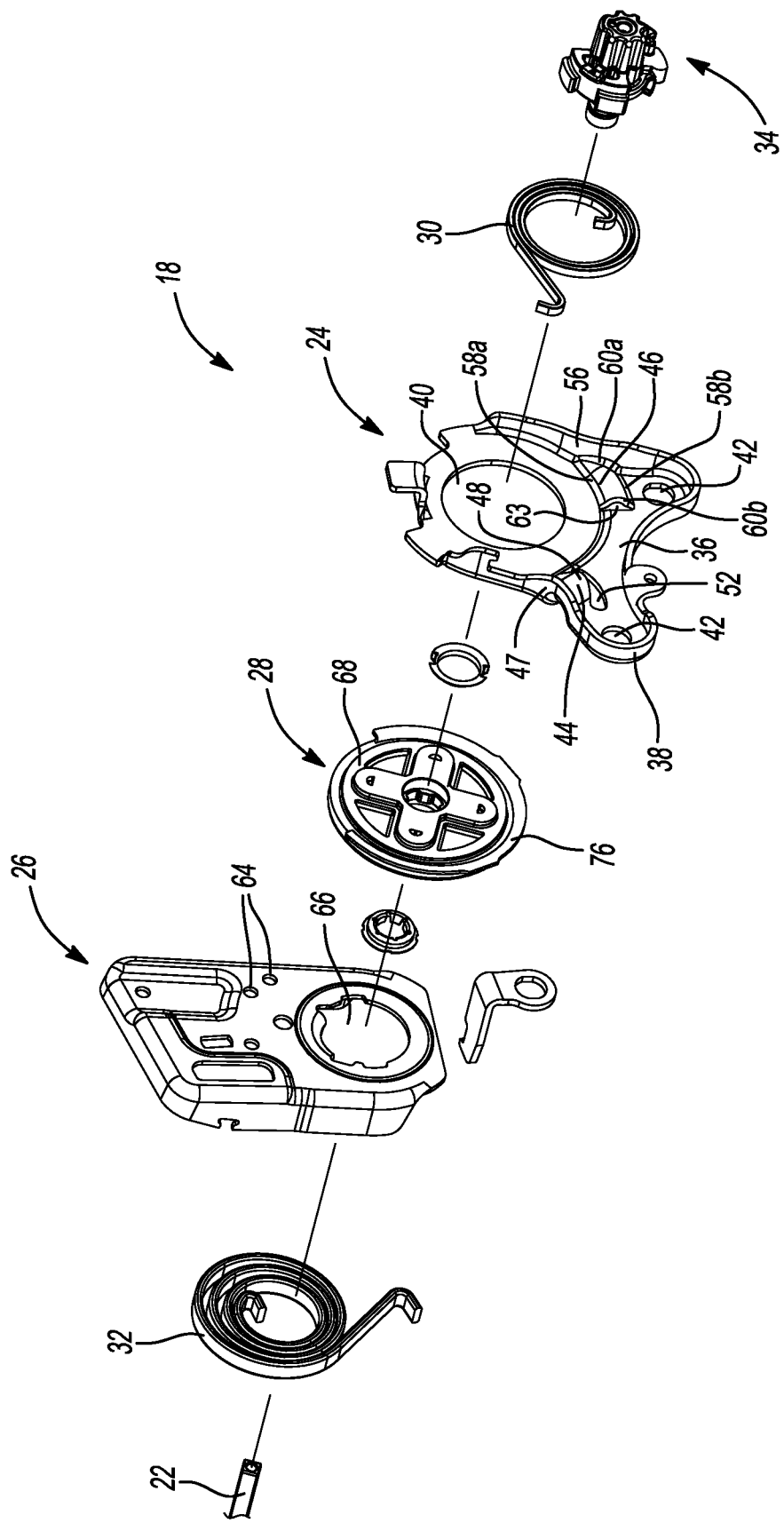
FIG. 5 is an exploded view of the recliner mechanism of FIG. 4.
Figure 6:
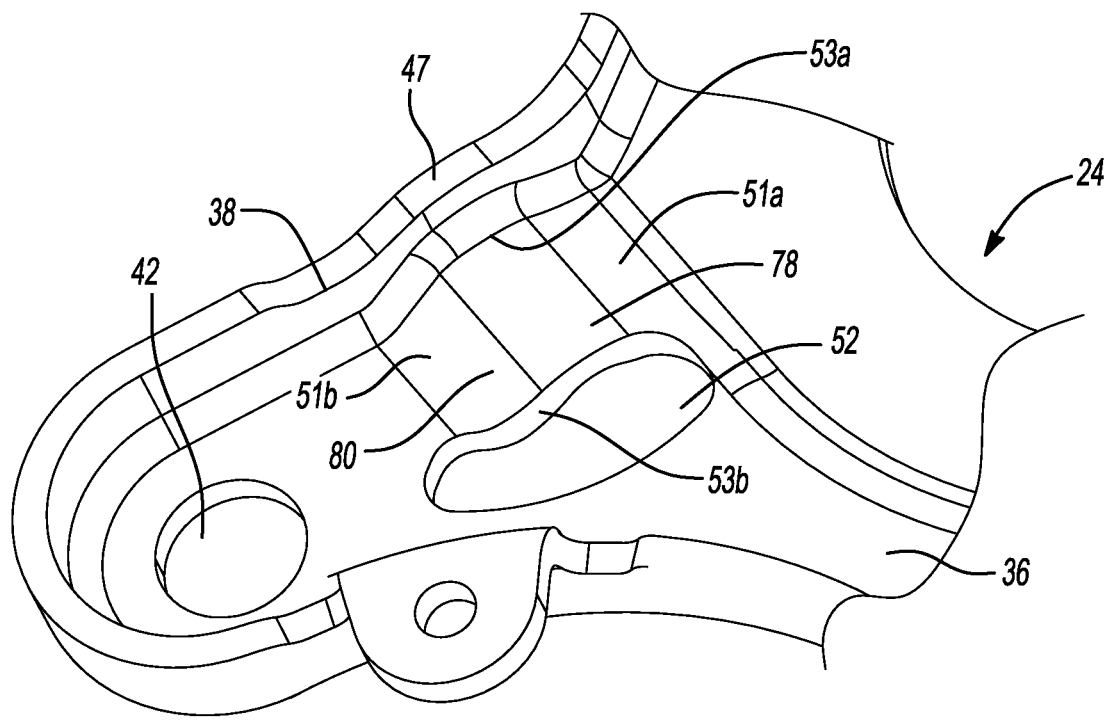
FIG. 6 is a partial perspective view of a lower bracket of the recliner mechanism showing a first gusset.

The first and second recliner mechanisms 18, 20 may be operable in a locked state preventing relative rotation between the seatback frame 12 and the seat bottom frame 14 and an unlocked state permitting relative rotation between the seatback frame 12 and the seat bottom frame 14 among the upright position, the rearward reclined position and the forward dump position. As shown in FIG. 5, the first recliner mechanism 18 may include a first bracket plate or housing plate 24, a second bracket plate 26, a recliner heart (or locking mechanism) 28, an outer coil spring 30, an inner coil spring 32 and a hub 34.

Figure 3:
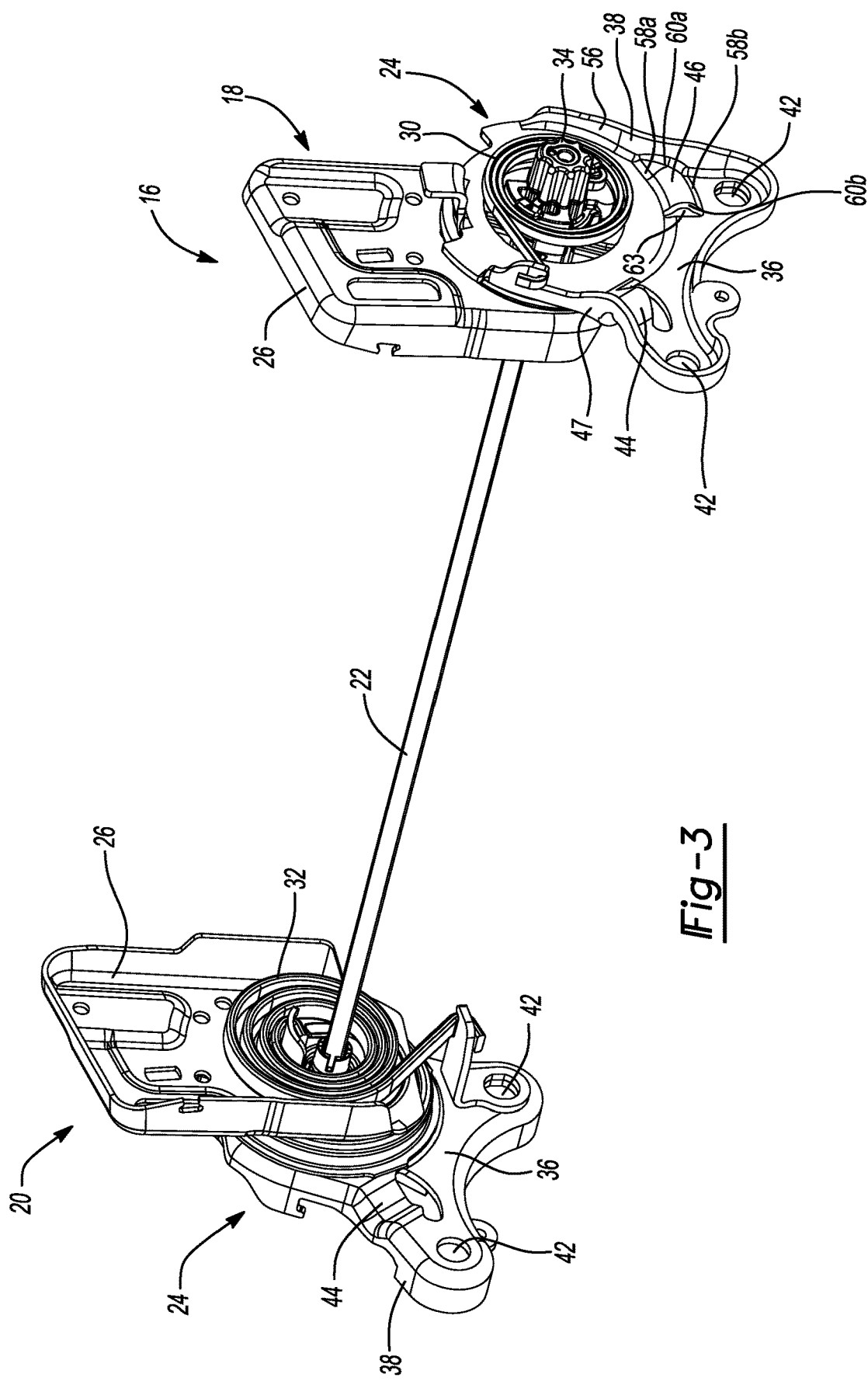
FIG. 3 is a perspective view of the recliner assembly of FIG. 1.
Figure 4:
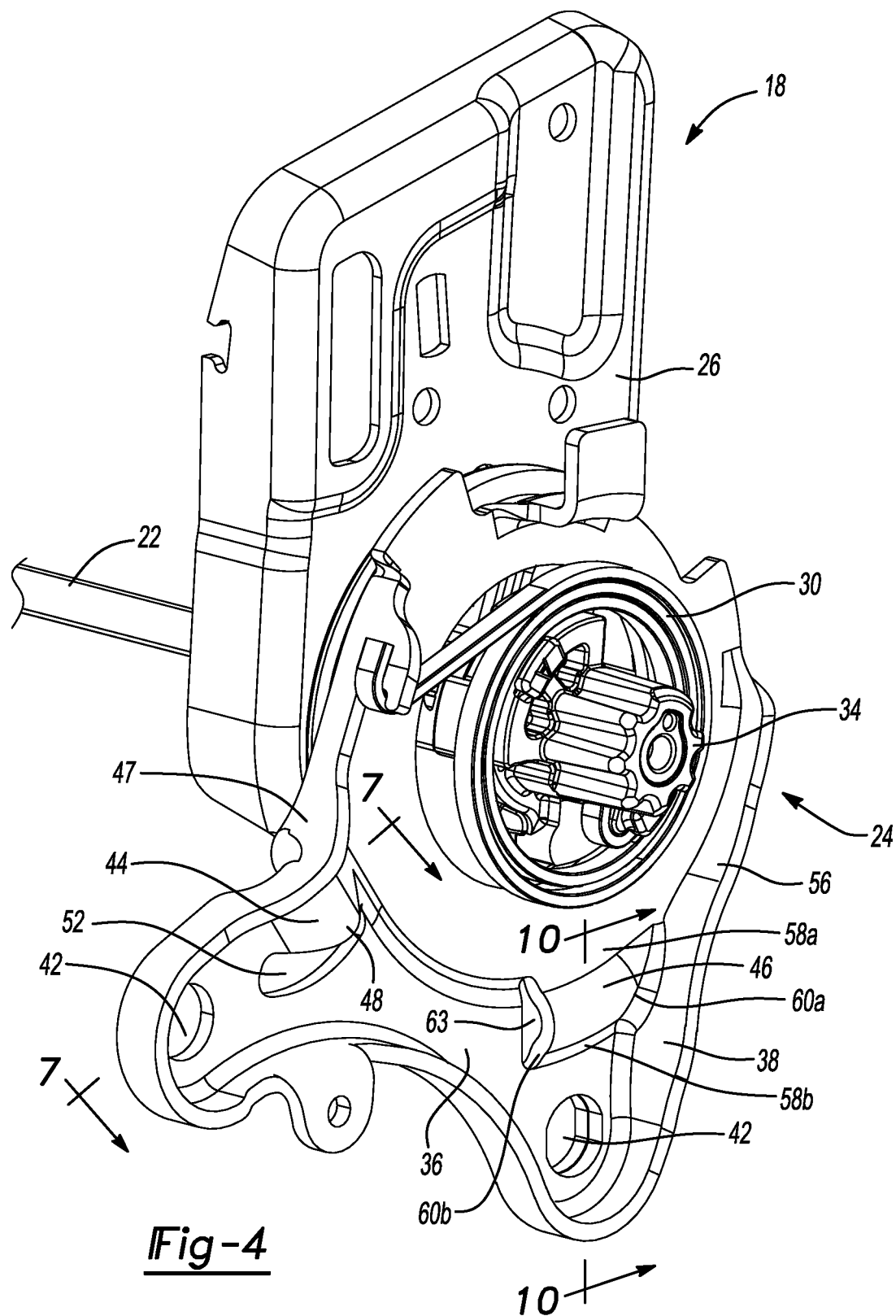
FIG. 4 is a perspective view of a recliner mechanism of the recliner assembly of FIG. 1.

As shown in FIG. 3, the first bracket plate 24 may be made of a metallic material (for example an SAE J2340 steel with grades of 340, 420, or 490XF) and may include a planar plate body 36 and a rim or flange 38. The plate body 36 may include a central aperture 40 (FIG. 5) and a plurality of mounting aperture 42 through which fasteners may extend to securely attach the first bracket plate 24 to the seat bottom frame 14 of the seat assembly 10.

Figure 7:
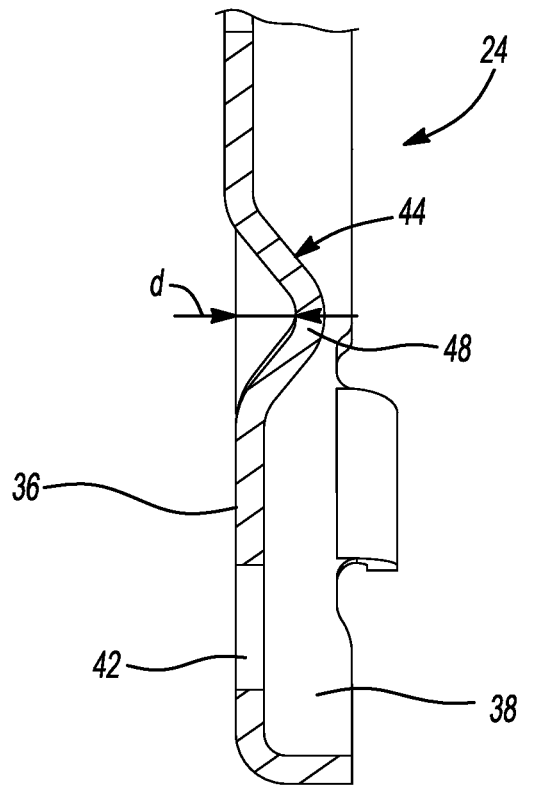
FIG. 7 is a cross-sectional view of the lower bracket taken along line 7-7 of FIG. 4.
Figure 8:
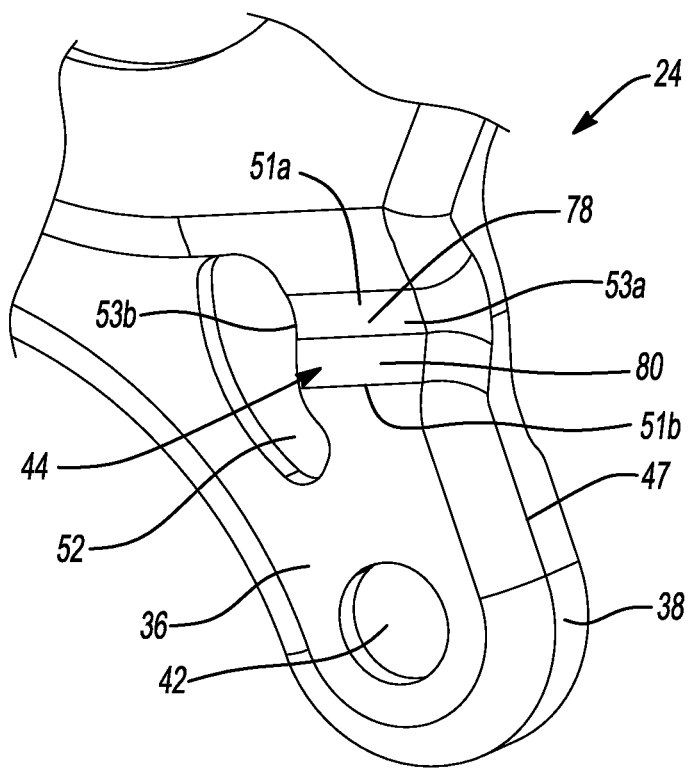
FIG. 8 is another partial perspective view of the lower bracket showing the first gusset.
Figure 9:
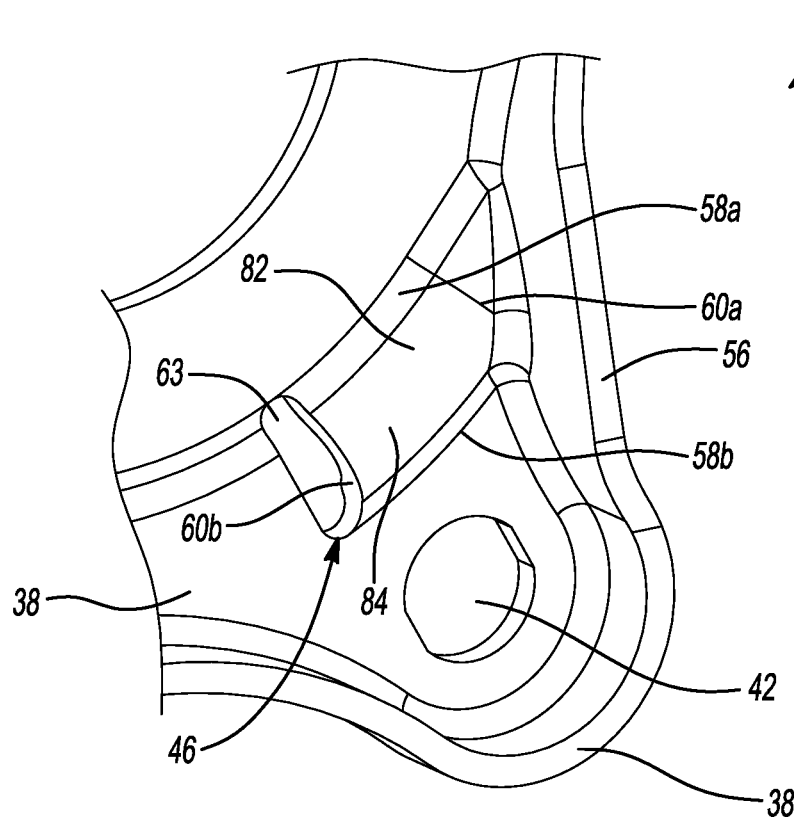
FIG. 9 is another partial perspective view of the lower bracket showing a second gusset.

The plate body 36 may also include a first protrusion or gusset 44 and a second protrusion or gusset 46. The protrusions 44, 46 may be integrally formed with the plate body 36 and may be formed from the same sheet metal as the rest of the first bracket plate 24. With reference to FIGS. 2-8, the first protrusion 44 may extend outwardly from the plate body 36 and the rim 38 and may be located at or near a fore end 47 of the first bracket plate 24 (the fore end 47 of the first bracket plate 24 is proximate a front end of the seat bottom frame 14). The first protrusion 44 may have an arcuate shape. The first protrusion 44 may have an upper end 51a that extends from the plate body 36 and a lower end 51b that is opposite the upper end 51a and also extends from the plate body 36. The first protrusion 44 is arcuate from the upper end 51a to the lower end 51b. The first protrusion 44 may also have a front end 53a that extends from the rim 38 and a rear end 53b that is opposite the front end 53a. A peak 48 of the first protrusion 44 may be a distance d from a surface 50 of the plate body 36 (FIG. 7). As shown in FIG. 7, the first protrusion 44 may have a generally V-shaped or U-shaped cross section. A slot or opening 52 may formed in the plate body 36 and may be adjacent to the rear end 53b of the first protrusion 44. In some configurations, the slot 52 may be curved.

As shown in FIGS. 1, 3-5 and 9, the second protrusion 46 may extend outwardly from the plate body 36 and the rim 38 in the same direction as the first protrusion 44. The second protrusion 46 may be located at or near an aft end 56 of the first bracket plate 24 (the aft end 56 of the first bracket plate 24 is proximate a rear end of the seat bottom frame 14) and may have an arcuate shape. The second protrusion 46 may have an upper end 58a that extends from the plate body 36 and a lower end 58b that is opposite the upper end 58a and also extends from the plate body 36. The second protrusion 46 is arcuate from the upper end 58a to the lower end 58b. The second protrusion 46 may also have a rear end 60a that extends from the rim 38 and a front end 60b that is opposite the rear end 60a.

Figure 10:
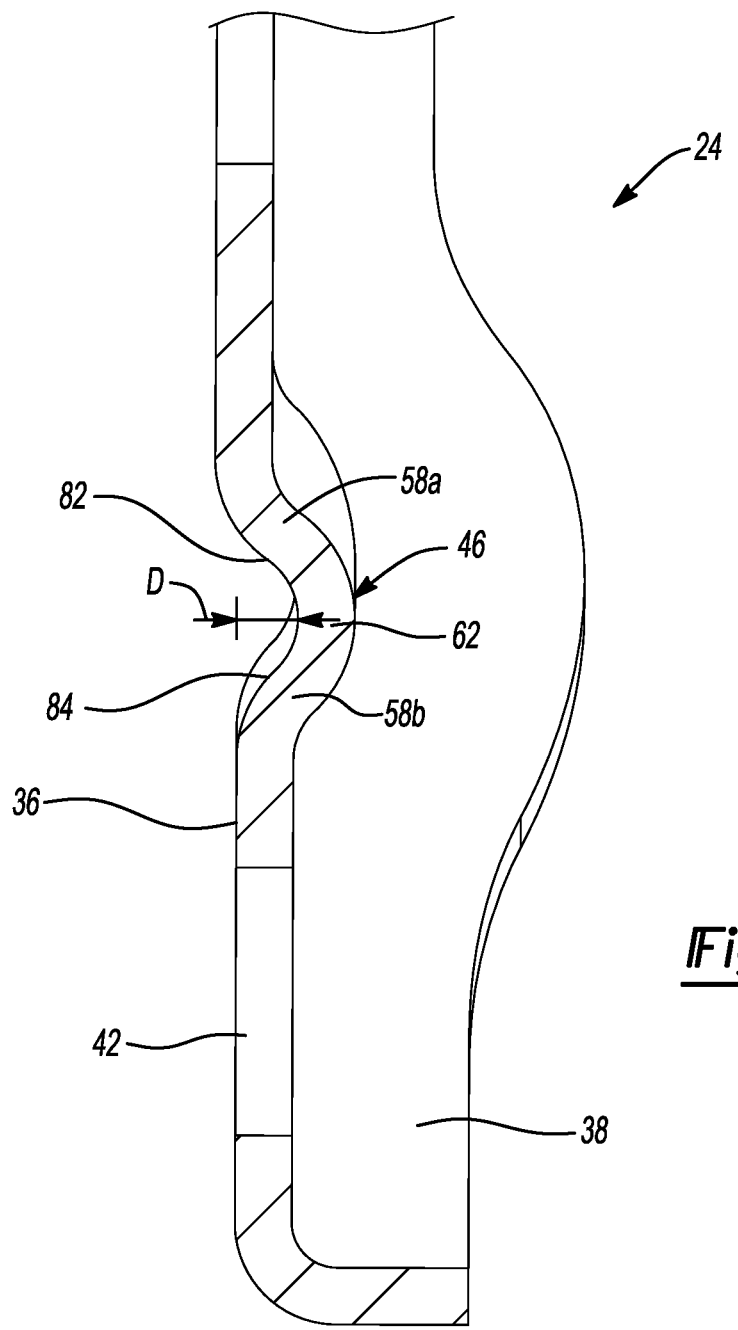
FIG. 10 is a cross-sectional view of the lower bracket taken along line 10-10 of FIG. 4.
Figure 11:
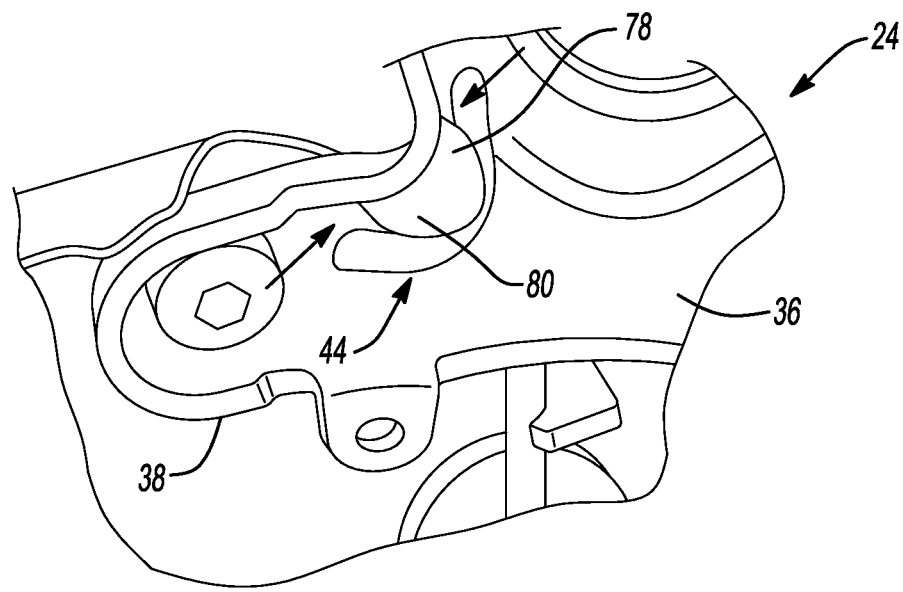
FIG. 11 is a partial perspective view of the lower bracket showing the first gusset after a vehicle impact event in a first direction.

As shown in FIG. 10, a peak or apex 62 of the second protrusion 46 may be a distance D from the surface 50 of the plate body 36. The distance D may be different from the distance d between the peak 48 of the first protrusion 44 and the surface 50 of the plate body 36. In some configurations, the distances d, D may be the same. As shown in FIG. 10, the second protrusion 46 may have a generally V-shaped or U-shaped cross section. A length of the second protrusion 46 (the length of the second protrusion 46 extends from the rear end 60a to the front end 60b) may extend in a different direction than a length of the first protrusion 44 (the length of the first protrusion 44 extends from the upper end 51a to the lower end 51b). A slot or opening 63 may be formed in the plate body 36 and may be adjacent to the front end 60b of the second protrusion 46. The rim 38 may extend from and around at least a portion of a periphery of the plate body 36 in the same direction as the first and second protrusions 44, 46.

As shown in FIG. 5, the second bracket plate 26 may be generally rectangular and may include a plurality of apertures 64 and a central aperture 66 through which the cross member 22 extends. Fasteners may extend through the plurality of apertures 64 to securely attach the second bracket plate 26 to the seatback frame 12.

The recliner heart 28 may be mounted to the first and second bracket plates 24, 26 and may be operable in an unlocked state permitting relative rotation between the seatback frame 12 and the seat bottom frame 14 and a locked state preventing relative rotation between the seatback frame 12 and the seat bottom frame 14. The recliner heart 28 may be a round recliner heart, for example, or any other suitable type of recliner heart. The recliner heart 28 may include a first plate 68, a second plate and a locking mechanism. The first plate 68 may be rotationally fixed relative to the seat bottom frame 14.

The second plate may be rotationally fixed to the seatback frame 12 and may cooperate with the first plate 68 to define a cavity in which the locking mechanism is disposed and the hub 34 is partially disposed. The second plate may cooperate with the locking mechanism to operate the recliner heart 28 between the locked state in which the locking mechanism engages the second plate to restrict movement of the second plate relative to the first plate 68 and the unlocked state in which the locking mechanism is disengaged from the second plate to permit relative rotation of the seatback frame 12 and the seat bottom frame 14.

The locking mechanism may include, inter alia, coil springs, locking pawls having teeth and a cam. The coil springs may engage the cam so as to bias the teeth of the locking pawls into meshing engagement with teeth of the second plate when the recliner heart 28 is in the locked state. The teeth of the locking pawls may be disengaged from the teeth of the second plate when the recliner heart 28 is in the unlocked state. The recliner heart 28 can be similar or identical to that disclosed in Assignee's U.S. Pat. No. 10,800,296, the disclosure of which is incorporated herein by reference.

An encapsulating ring 76 is disposed between the first and second bracket plates 24, 26 and covers the recliner heart 28 at a periphery thereof, thereby preventing debris and fluid from damaging components. The encapsulating ring 76 may be attached (e.g., welded) to the first bracket plate 24 and the first plate 68 of the recliner heart 28.

The outer coil spring 30 may exert a torsional force that biases the recliner heart 28 toward a locked state. The outer coil spring 30 may wrap around the hub 34 and engage the first bracket plate 24 and the hand lever. The inner coil spring 32 may extend around the cross member 22 and may engage the first and second bracket plates 24, 26 to rotationally bias the seatback frame 12 toward the upright position relative to the seat bottom frame 14. The hub 34 may engage the hand lever and the recliner heart 28 and may transmit motion of the hand lever to the recliner heart 28 to cause the recliner heart 28 to move between the locked and unlocked states.

The structure and function of the second recliner mechanism 20 may be similar or identical to that of the first recliner mechanism 18 and, therefore, will not be described again in detail. The cross member 22 may extend in a cross-vehicle direction and may connect the first recliner mechanism 18 to the second recliner mechanism 20. In this way, the cross member 22 may transmit rotational motion of the first recliner mechanism 18 to the second recliner mechanism 20 to move the second recliner mechanism 20 between the locked and unlocked states simultaneously with motion of the first recliner mechanism 18 between the locked and unlocked states.

Figure 12:
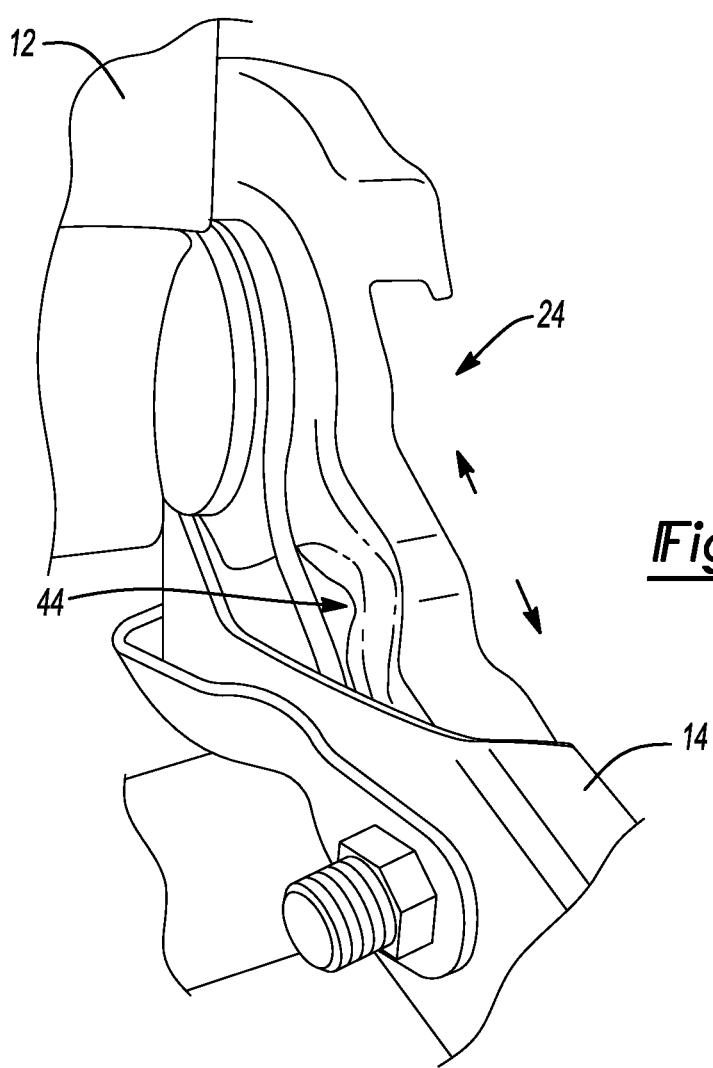
FIG. 12 is a partial perspective view of the lower bracket showing the first gusset after a vehicle impact event in a second direction.

With continued reference to FIGS. 1-12, operation of the seat recliner assembly 16 will now be described in detail. When a vehicle impact event occurs (e.g., a vehicle accident) that exerts a force to the seatback frame 12 in a counter-clockwise direction with respect to FIG. 1, the first and second gussets 44, 46 of the first bracket plates 24 absorb the force of the impact event, which causes the first and second gussets 44, 46 to deform (i.e., causes the first and second gussets 44, 46 to collapse or buckle as shown in FIG. 12 with regards to the front gusset 44 collapsing). This, in turn, reduces the energy transferred to other areas of the first bracket plates 24 and other components of the recliner mechanisms 18, 20 (e.g., the recliner hearts 28) such that the seatback frame 12 does not move during the impact event. When the first gussets 44 collapse, a first region 78 of the first gussets 44 proximate the upper end 51a and a second region 80 of the first gussets 44 proximate the lower end 51b move toward each other as shown in FIG. 12. Similarly, when the second gussets 46 collapse, a first region 82 of the second gussets 46 proximate the upper end 58a and a second region 84 of the first gussets 44 proximate the lower end 58b move toward each.

Figure 13:
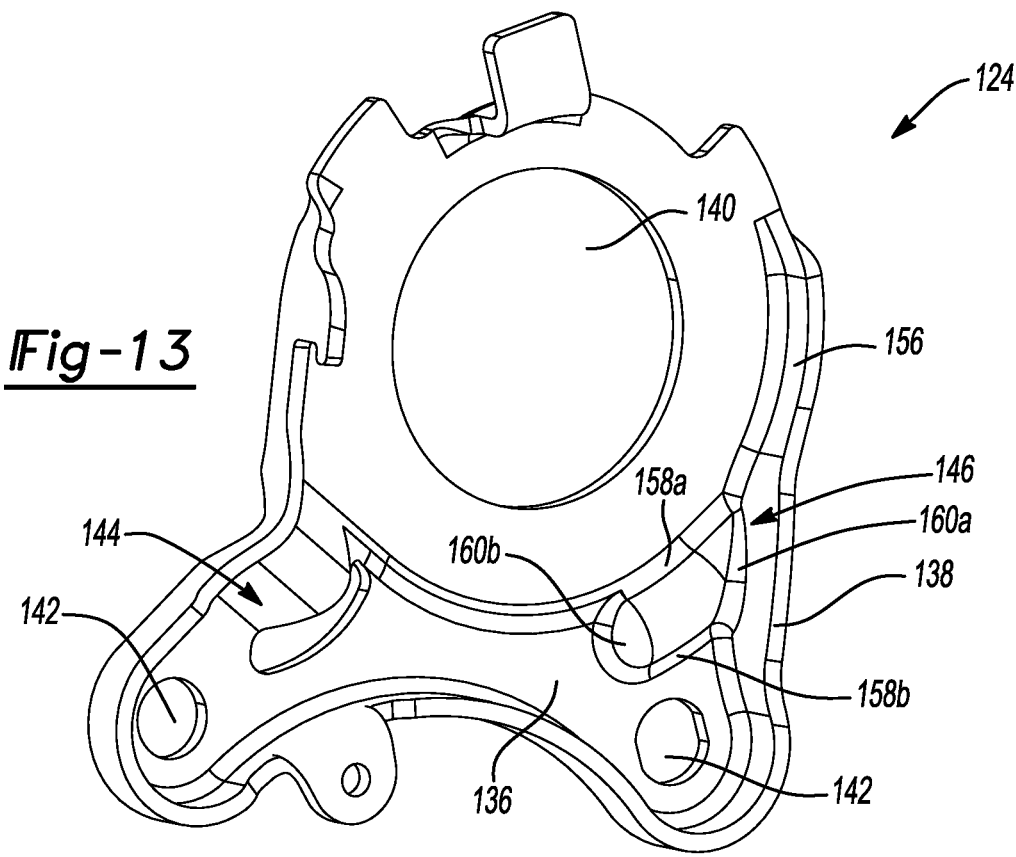
FIG. 13 is a perspective view of another lower bracket.

When a vehicle impact event occurs that exerts a force to the seatback frame 12 in a clockwise direction with respect to FIG. 1, the first and second gussets 44, 46 of the first bracket plates 24 absorb the force of the impact event, which causes the first and second gussets 44, 46 to deform (i.e., causes the first and second gussets 44, 46 to stretch or flatten as shown in FIG. 13 with regards to the first gusset 44 stretching). This, in turn, reduces the energy transferred to other areas of the first bracket plates 24 and other components of the recliner mechanisms 18, 20 (e.g., the recliner hearts 28) such that the seatback frame 12 does not move during the impact event. When the first gussets 44 stretch, the first region 78 of the first gussets 44 proximate the upper end 51a and the second region 80 of the first gussets 44 proximate the lower end 51b move away from each other. Similarly, when the second gussets 46 stretch, the first region 82 of the second gussets 46 proximate the upper end 58a and the second region 84 of the first gussets 44 proximate the lower end 58b move away from each other.

It should be understood that features of each of the first and second gussets 44, 46 such as the lengths of the gussets 44, 46 and the distances between the peaks of the gussets 44, 46 and the surfaces 50 of the plate bodies 36 may be adjusted to further optimize performance of the first bracket plates 24 (i.e., the first and second gussets 44, 46 absorbing the force of the impact event such that the seatback frame 12 does not move during the impact event). Furthermore, other features of the bracket plates 24 such as slots adjacent to the gussets 44, 46 and heights of the flanges 38 may also be adjusted to further optimize the performance of the first bracket plates 24.

With reference to FIG. 13, a bracket plate 124 is provided. The bracket plate 124 may be incorporated into one or both of the recliner mechanisms 18, 20 described above instead of the bracket plates 24. The structure and function of the bracket plate 124 may be similar or identical to that of the bracket plates 24 described above, apart from any exceptions noted below.

The bracket plate 124 may include a plate body 136 and a rim or flange 138. The plate body 136 may include a central aperture 140 and a plurality of mounting aperture 142 through which fasteners may extend to securely attach the bracket plate 124 to the seat bottom frame 14 of the seat assembly 10.

The plate body 136 may also include a first protrusion or gusset 144 and a second protrusion or gusset 146. The first protrusion 144 may be similar or identical to that of the protrusion 44 described above, and therefore, will not be described again in detail.

The second protrusion 146 may extend outwardly from the plate body 136 and the rim 138 in the same direction as the first protrusion 144. The second protrusion 146 may be located at or near an aft end 156 of the bracket plate 124 (the aft end 156 of the bracket plate 124 is proximate the rear end of the seat bottom frame 14) and may have an arcuate shape. The second protrusion 146 may have an upper end 158a that extends from the plate body 136 and a lower end 158b that is opposite the upper end 158a and also extends from the plate body 136. The second protrusion 146 is arcuate from the upper end 158a to the lower end 158b. The second protrusion 146 may also have a rear end 160a that extends from the rim 138 and a front end 160b that is opposite the rear end 160a and extends from the plate body 136.

Figure 14:
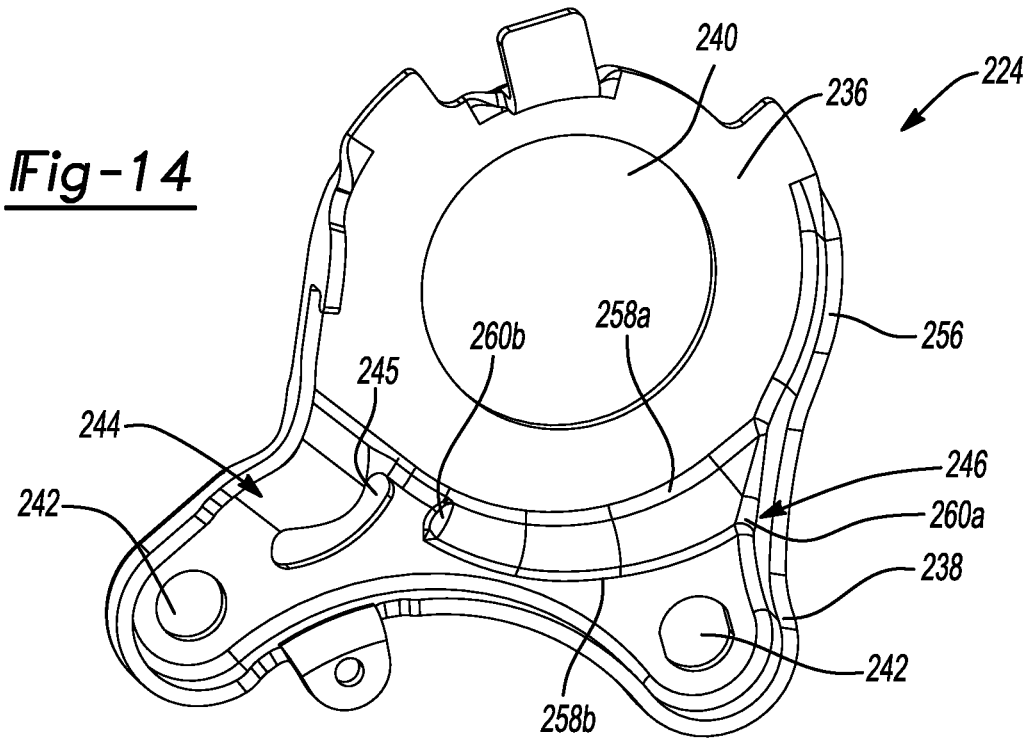
FIG. 14 is a perspective view of yet another lower bracket.

With reference to FIG. 14, a bracket plate 224 is provided. The bracket plate 224 may be incorporated into one or both of the recliner mechanisms 18, 20 described above instead of the bracket plates 24, 124. The structure and function of the bracket plate 224 may be similar or identical to that of the bracket plates 24, 124 described above, apart from any exceptions noted below.

The bracket plate 224 may include a plate body 236 and a rim or flange 238. The plate body 236 may include a central aperture 240 and a plurality of mounting aperture 242 through which fasteners may extend to securely attach the bracket plate 224 to the seat bottom frame 14 of the seat assembly 10.

The plate body 236 may also include a first protrusion or gusset 244 and an elongated second protrusion or gusset 246. The first protrusion 244 may be similar or identical to that of the protrusions 44, 144 described above, and therefore, will not be described again in detail.

The second protrusion 246 may extend outwardly from the plate body 136 and the rim 138 in the same direction as the first protrusion 244. The second protrusion 246 may be located at or near an aft end 256 of the bracket plate 224 (the aft end 256 of the bracket plate 224 is proximate the rear end of the seat bottom frame 14) and may have an arcuate shape. The second protrusion 246 may have an upper end 258a that extends from the plate body 236 and a lower end 258b that is opposite the upper end 258a and also extends from the plate body 236. The second protrusion 246 is arcuate from the upper end 258a to the lower end 258b. The second protrusion 246 may also have a rear end 260a that extends from the rim 238 and a front end 260b that is opposite the rear end 260a and extends from the plate body 236. The front end 260b may be adjacent to a curved slot 245 that in turn at least partially surrounds the first protrusion 244. The second protrusion 246 may be arcuate from the rear end 260a to the front end 260b. The second protrusion 246 may also decrease in width as it extends from the rear end 260a to the front end 260b.

Figure 15:
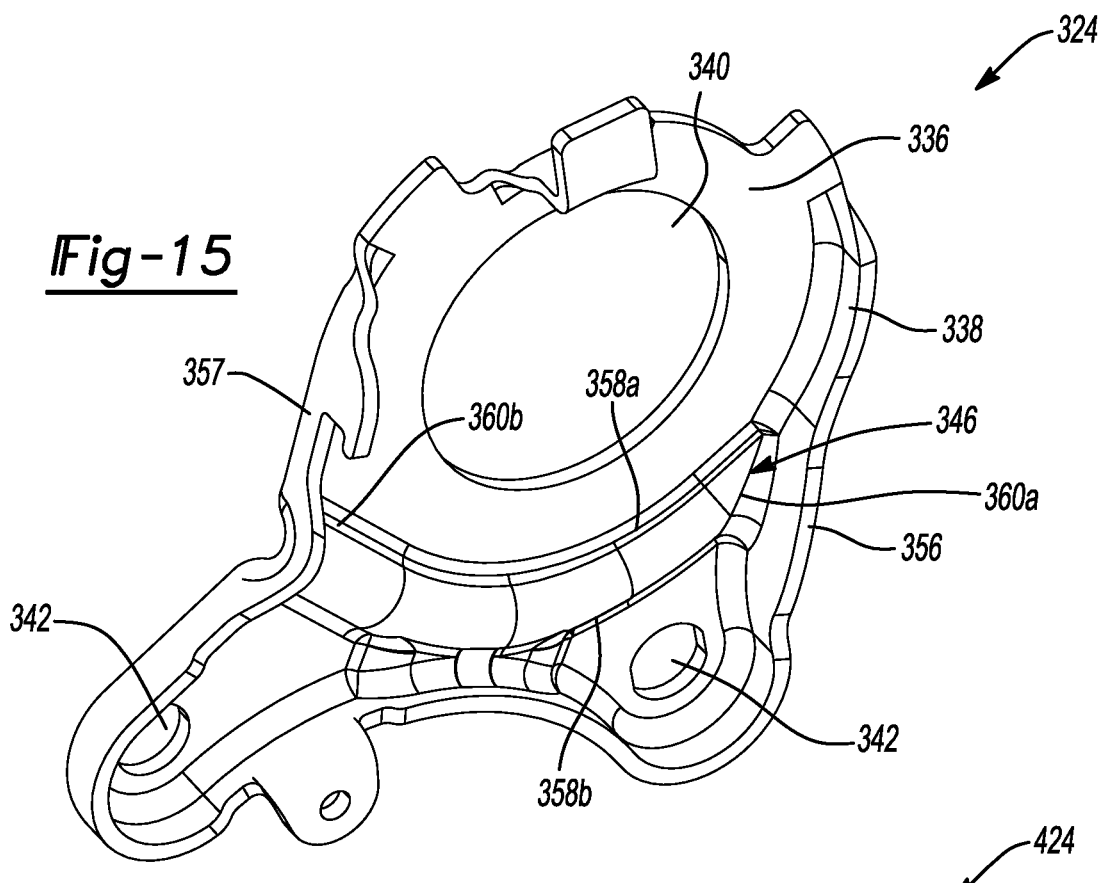
FIG. 15 is a perspective view of yet another lower bracket.

With reference to FIG. 15, a bracket plate 324 is provided. The bracket plate 324 may be incorporated into one or both of the recliner mechanisms 18, 20 described above instead of the bracket plates 24, 124, 224. The structure and function of the bracket plate 324 may be similar or identical to that of the bracket plates 24, 124, 224 described above, apart from any exceptions noted below.

The bracket plate 324 may include a plate body 336 and a rim or flange 338. The plate body 336 may include a central aperture 340 and a plurality of mounting aperture 342 through which fasteners may extend to securely attach the bracket plate 324 to the seat bottom frame 14 of the seat assembly 10.

The plate body 336 may also include an elongated protrusion or gusset 346. The protrusion 346 may extend outwardly from the plate body 336 and the rim 338 in the same direction as the rim 338. The protrusion 346 may extend from an aft end 356 of the bracket plate 324 (the aft end 356 of the bracket plate 324 is proximate the rear end of the seat bottom frame 14) to a fore end 357 of the bracket plate 324 (the fore end 357 of the bracket plate 324 is proximate the front end of the seat bottom frame 14). The protrusion 346 may have an arcuate shape and may have an upper end 358a that extends from the plate body 336 and a lower end 358b that is opposite the upper end 358a and also extends from the plate body 336. The protrusion 346 is arcuate from the upper end 358a to the lower end 358b. The protrusion 346 may also have a rear end 360a that extends from the rim 338 and a front end 360b that is opposite the rear end 360a and also extends from the rim 338. The protrusion 346 may be arcuate from the rear end 360a to the front end 360b.

Figure 16:
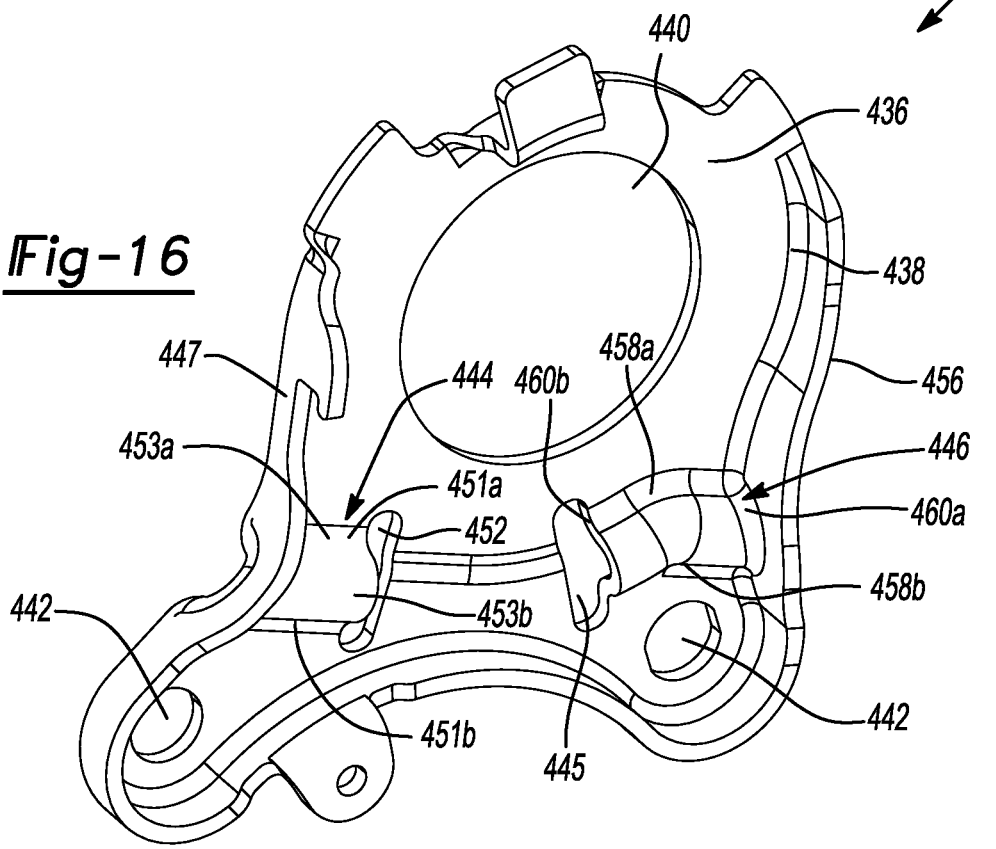
FIG. 16 is a perspective view of yet another lower bracket.

With reference to FIG. 16, a bracket plate 424 is provided. The bracket plate 424 may be incorporated into one or both of the recliner mechanisms 18, 20 described above instead of the bracket plates 24, 124, 224, 324. The structure and function of the bracket plate 424 may be similar or identical to that of the bracket plates 24, 124, 224, 324 described above, apart from any exceptions noted below.

The bracket plate 424 may include a plate body 436 and a rim or flange 438. The plate body 436 may include a central aperture 440 and a plurality of mounting aperture 442 through which fasteners may extend to securely attach the bracket plate 424 to the seat bottom frame 14 of the seat assembly 10.

The plate body 436 may also include a first protrusion or gusset 444 and a second protrusion or gusset 446. The first protrusion 444 may extend outwardly from the plate body 436 and the rim 438 and may be located at or near a fore end 447 of the first bracket plate 424 (the fore end 447 of the first bracket plate 424 is proximate a front end of the seat bottom frame 14). The first protrusion 444 may have an arcuate shape. The first protrusion 444 may have an upper end 451a that extends from the plate body 436 and a lower end 451b that is opposite the upper end 451a and also extends from the plate body 436. The first protrusion 444 is arcuate from the upper end 451a to the lower end 451b. The first protrusion 444 may also have a front end 453a that extends from the rim 438 and a rear end 453b that is opposite the front end 453a. A slot or opening 452 may be formed in the plate body 436 and may be adjacent to the rear end 453b of the first protrusion 444.

The second protrusion 446 may extend outwardly from the plate body 436 and the rim 438 in the same direction as the first protrusion 444. The second protrusion 446 may be located at or near an aft end 456 of the bracket plate 424 (the aft end 456 of the bracket plate 424 is proximate the rear end of the seat bottom frame 14) and may have an arcuate shape. The second protrusion 446 may have an upper end 458a that extends from the plate body 436 and a lower end 458b that is opposite the upper end 458a and also extends from the plate body 436. The second protrusion 446 is arcuate from the upper end 458a to the lower end 458b. The second protrusion 446 may also have a rear end 460a that extends from the rim 438 and a front end 460b that is opposite the rear end 460a. The front end 460b may be adjacent to a slot 445 (i.e., the slots 445, 452 are positioned between the first and second protrusions 444, 446).

Figure 17:
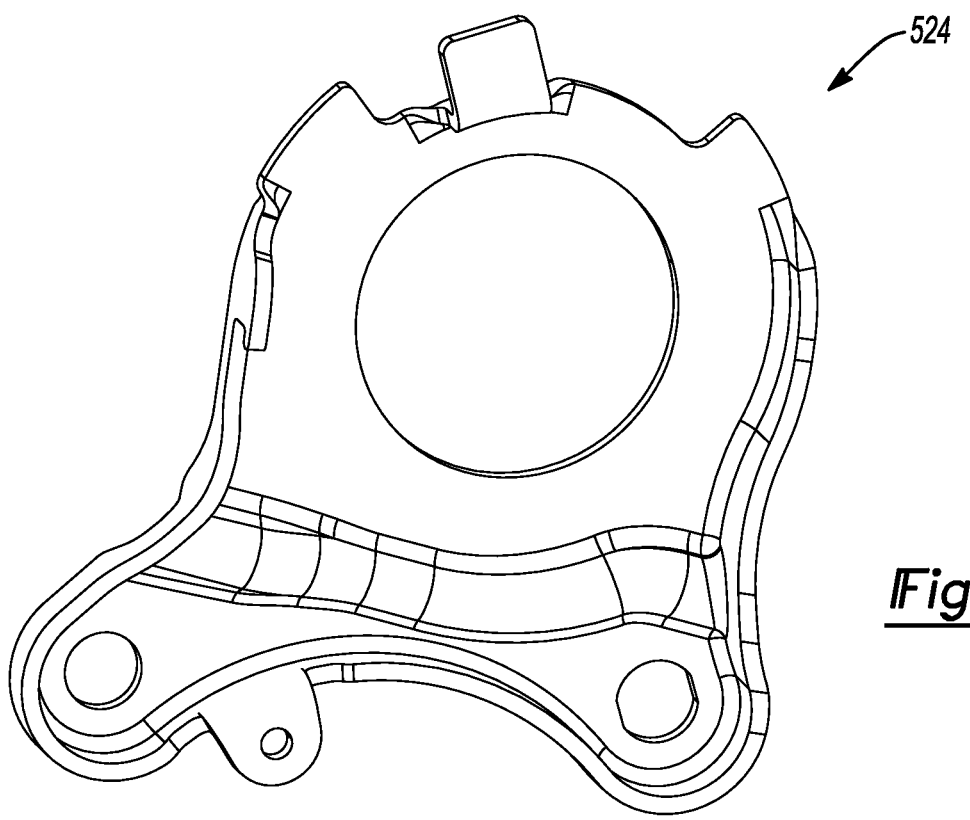
FIG. 17 is a perspective view of yet another lower bracket.

With reference to FIG. 17, a bracket plate 524 is provided. The bracket plate 524 may be incorporated into one or both of the recliner mechanisms 18, 20 described above instead of the bracket plates 24, 124, 224, 324, 424.

Figure 18:
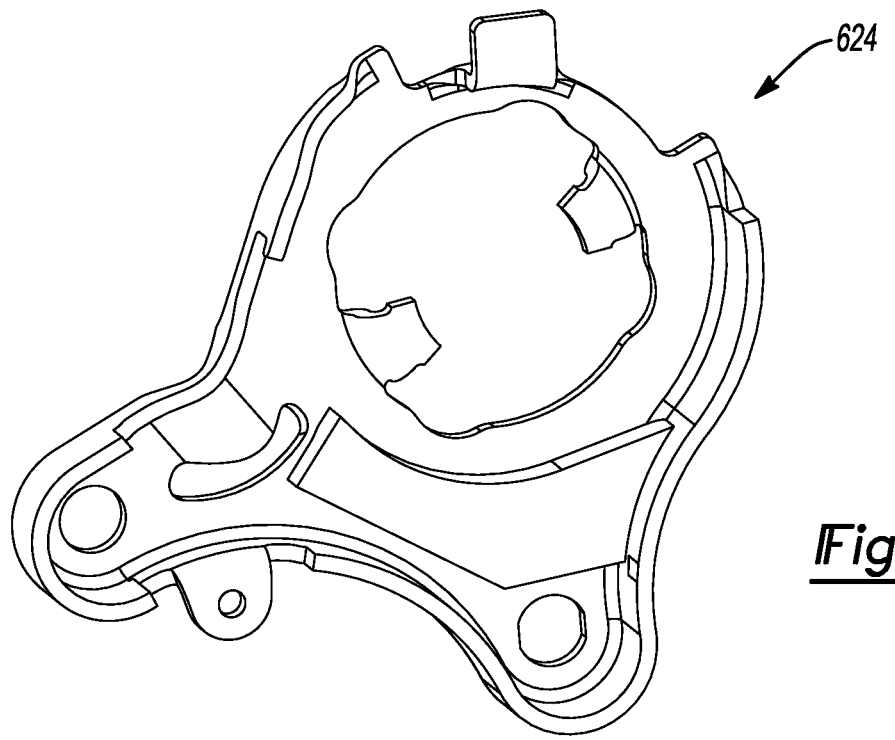
FIG. 18 is a perspective view of yet another lower bracket.

With reference to FIG. 18, a bracket plate 624 is provided. The bracket plate 624 may be incorporated into one or both of the recliner mechanisms 18, 20 described above instead of the bracket plates 24, 124, 224, 324, 424, 524.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A recliner mechanism comprising:
a housing plate including a planar plate body; and
a recliner heart mounted to the housing plate and operable in an unlocked state permitting relative rotation between a seatback and a seat bottom, and a locked state preventing relative rotation between the seatback and the seat bottom, wherein the housing plate includes a fore end proximate a front of the seat bottom and an aft end opposing the fore end and proximate a rear end of the seat bottom, the planar plate body includes a second protrusion extending outwardly therefrom at or near the aft end, wherein the planar plate body includes a first protrusion extending outwardly therefrom at or near the fore end of the housing plate, and wherein when the first and second protrusions are in non-deformed states prior to absorbing a force associated with a vehicle impact event, a first distance between a surface of the planar plate body and a peak of the first protrusion is different from a second distance between the surface of the planar plate body and a second peak of the second protrusion.

2. The recliner mechanism of claim 1, wherein the first and second protrusions are allowed to absorb energy and deform upon an impact event, thereby reducing energy transferred to the recliner heart.

3. The recliner mechanism of claim 1, wherein the first and second protrusions are allowed to absorb energy and stretch upon an impact event, thereby reducing energy transferred to the recliner heart.

4. The recliner mechanism of claim 1, wherein the first and second protrusions are allowed to absorb energy and collapse upon an impact event, thereby reducing energy transferred to the recliner heart.

5. The recliner mechanism of claim 1, wherein the housing plate includes a flange extending from and at least partially around the planar plate body, and wherein the flange and the first and second protrusions extend in the same direction.

6. The recliner mechanism of claim 1, wherein the planar plate body defines an opening extending therethrough such that an end of the second protrusion is spaced apart from the planar plate body.

7. The recliner mechanism of claim 1, wherein the second protrusion is an elongated protrusion extending from the aft end of the housing plate toward the fore end of the housing plate.

8. The recliner mechanism of claim 1, wherein the second protrusion has a first end positioned at or near the aft end and a second end positioned closer to the fore end than the aft end, and wherein the second protrusion is curved along a length thereof from the first end to the second end.

9. The recliner mechanism of claim 1, wherein the first protrusion partially defines an opening in the housing plate.

10. The recliner mechanism of claim 9, wherein the first protrusion is integrally formed with the housing plate and is formed from the same sheet metal as the housing plate, and wherein the first protrusion has a V-shaped or U-shaped cross section.

11. The recliner mechanism of claim 6, wherein a curved slot is formed in the planar body of housing plate, and wherein the curved slot is disposed between the first and second protrusions and is partially defined by the first protrusion.

12. A recliner mechanism comprising:
a housing plate including a planar plate body; and
a recliner heart mounted to the housing plate and operable in an unlocked state permitting relative rotation between a seatback and a seat bottom, and a locked state preventing relative rotation between the seatback and the seat bottom, wherein the housing plate includes a fore end proximate a front of the seat bottom and an aft end opposing the fore end and proximate a rear end of the seat bottom, the planar plate body includes a first protrusion extending outwardly therefrom at or near the fore end and a second protrusion extending outwardly therefrom at or near the aft end, wherein a curved slot is formed in the planar body of the housing plate, and wherein the curved slot is disposed between the protrusions and is partially defined by the first protrusion, and wherein the second protrusion partially defines an opening in the housing plate, and wherein the opening is partially defined by the planar body of the housing plate.

13. The recliner mechanism of claim 12, wherein the housing plate includes a flange extending from and at least partially around the planar plate body, and wherein the flange and the first and second protrusions extend in the same direction.

14. The recliner mechanism of claim 13, wherein the second protrusion is an elongated protrusion extending from the aft end of the housing plate toward the fore end of the housing plate.

15. The recliner mechanism of claim 14, wherein when the first and second protrusions are in non-deformed states prior to absorbing a force associated with a vehicle impact event, a first distance between a surface of the planar plate body and a peak of the first protrusion is different from a second distance between the surface of the planar plate body and a second peak of the second protrusion.

16. The recliner mechanism of claim 15, wherein the second protrusion is curved along a length thereof extending between the aft and fore ends.

17. The recliner mechanism of claim 16, wherein the first and second protrusions are integrally formed with the housing plate and are formed from the same sheet metal as the housing plate, and wherein the first and second protrusions have a V-shaped or U-shaped cross section.

* * * * *